United States Patent [19]

Lietar et al.

[11] Patent Number: 4,669,032

[45] Date of Patent: May 26, 1987

[54] LOW BEAM OR FOG HEADLAMP FOR MOTOR VEHICLES

[75] Inventors: Christian Lietar, Morges, Switzerland; Peter Perthus, Stuttgart, Fed. Rep. of Germany

[73] Assignee: Robert Bosch GmbH, Stuttgart, Fed. Rep. of Germany

[21] Appl. No.: 893,894

[22] Filed: Jul. 29, 1986

[30] Foreign Application Priority Data

Aug. 31, 1985 [DE] Fed. Rep. of Germany ....... 3531224

[51] Int. Cl.[4] ................................ B60Q 1/00

[52] U.S. Cl. ................................ 362/61; 362/307; 362/309

[58] Field of Search ................ 362/61, 296, 297, 307, 362/309, 310, 347, 346, 350, 375

[56] References Cited

U.S. PATENT DOCUMENTS

| | | | |
|---|---|---|---|
| 3,818,210 | 6/1974 | Pitkjaan | 362/61 |
| 3,858,040 | 12/1974 | Ricard | 362/309 |
| 4,238,817 | 12/1980 | Fratty | 362/61 |
| 4,303,965 | 12/1981 | Vile et al. | 362/61 |
| 4,523,262 | 6/1985 | Shinkai | 362/61 |
| 4,530,042 | 7/1985 | Cibie et al. | 362/309 |
| 4,607,318 | 8/1986 | Lindae | 362/309 |

FOREIGN PATENT DOCUMENTS

| | | | |
|---|---|---|---|
| 1090521 | 10/1954 | France | 362/309 |

*Primary Examiner*—James C. Yeung
*Attorney, Agent, or Firm*—Michael J. Striker

[57] ABSTRACT

An antidazzle headlamp has a reflector which is asymmetric relative to a horizontal plane passing through an optical axis of the reflector. The contours of the reflector corresponding to vertical sections in parallel planes forming right angles with a horizontal plane passing through the optical axis, form an upper and a lower half ellipse. Both half ellipses in each vertical section have a common large axis which is staggered upward relative to the horizontal plane. In this manner an antidazzle light beam is created which guarantees an intensive and complete illumination of edges of a roadway even at a close range from the motor vehicle.

11 Claims, 4 Drawing Figures

LOW BEAM OR FOG HEADLAMP FOR MOTOR VEHICLES

BACKGROUND OF THE INVENTION

The present invention relates to a low beam - or fog headlamp for motor vehicles. The headlamp being of the type which includes a reflector defining a vertex, an optical axis and a focal point, meridian or axial sections of the reflector forming curves of higher order, a light source arranged substantially in the focal point, a screen having an edge delimiting a light-dark boundary plane for a light beam emitted from the light source and a light projecting objective arranged in front of the screen.

Headlamps of this kind have a large light transmission range on the one hand and provide sufficient illumination of both edges of a highway at a large distance from the vehicle; moreover it sufficiently illuminates also in a close range from the vehicle. However, at the close range the edges of the highway, especially the left-hand edge (in the case of right hand traffic) are not sufficiently illuminated.

SUMMARY OF THE INVENTION

It is therefore an object of this invention to overcome this disadvantage.

In particular, it is an object of this invention to provide an improved headlamp of the above described kind which guarantees a sufficient illumination of both margins of a roadway, particularly of the left hand edge even at a close range.

Another object of this invention is to provide such an improved headlamp which is simple in design and inexpensive in manufacture.

In keeping with these objects and others which will become apparent hereafter, one feature of this invention resides in the headlamp of the aforedescribed type, in such a configuration of the reflector that the meridian or axial sections thereof are assymetric relative to a horizontal plane passing through the optical axis of the reflector, vertical sections of the reflector in parallel planes including right angles with the horizontal plane forming closed curves, the part of respective closed curves lying above the horizontal plane defining an upper half ellipse having a small axis, and the part of corresponding closed curves lying below the horizontal plane defining a lower half ellipse having a small axis which differs in length from the upper one, and both half ellipses in the respective vertical planes having a common large axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
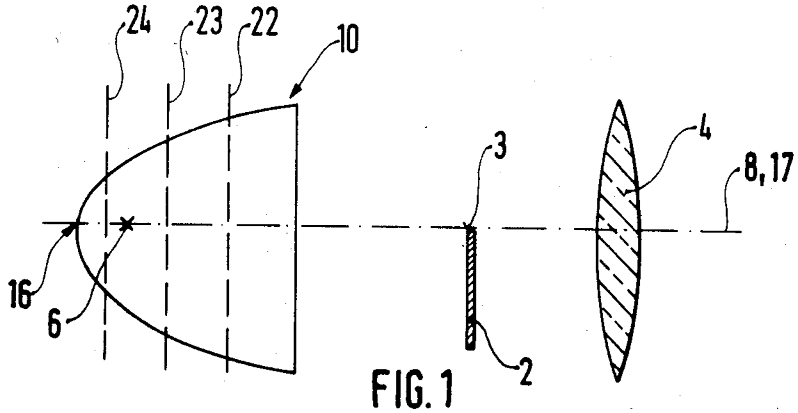
FIG. 1 illustrates schematically an axial section of a headlamp of this invention.

The anti-dazzle headlamp, such as a low beam or fog headlamp illustrated in FIG. 1 is assembled of a reflector 10 defining a vertex 16, an optical axis 8 and a focal point in which a light source 6 is arranged. Axial sections of the reflector, namely the sections in planes passing through the optical axis 8, form curves of higher order. In front of the reflector 10, a diaphragm or screen 2 is arranged whose optically effective edge 3 provides a light-dark boundary plane for the light beam emitted by the light source 6. In front of the screen 2, there is a provided a light projecting objective 4 which projects the light beam generated by the reflector 10 and the screen 2 on a non-illustrated roadway.

Figure 2:
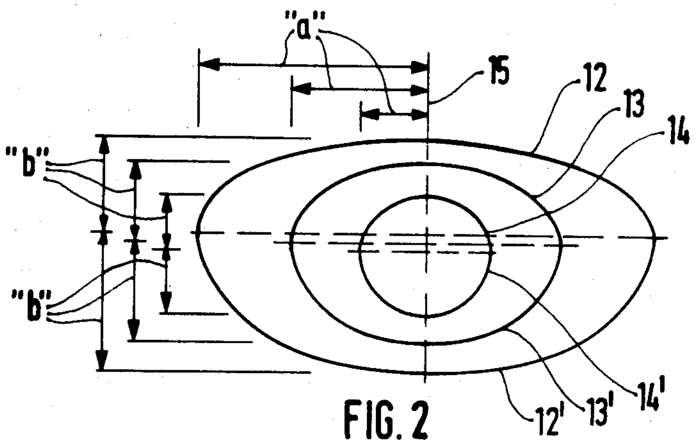
FIG. 2 shows the contours of three transverse sections of the reflector taken along the lines 22 through 24 in FIG. 1.

It will be seen from FIG. 2 that the reflector 2 is asymetric with respect to a horizontal plane 17 passing through the optical axis 8. The contours of the reflector corresponding to vertical sections of the reflector in parallel planes 22 through 24 arranged at right angles with the horizontal plane 17, form respectively closed curves. The illustrated closed curves define upper half ellipses 12 through 14 and lower half ellipses 12' through 14'. The half ellipses in each plane have a common half large axis a whereby the large axes lie in plane which slopes upwardly relative to the horizontal plane 17. The half small axes b of respective half ellipses 12 through 14 and 12' through 14' lie in a vertical plane 15 passing through the optical axis 8. The clearance or the shortest distance of the common large axis a of respective half ellipses from the horizontal plane 17 is a function of the distance of the corresponding sectional plane (22 through 24) from the vertex 16 of the reflector 10.

In a preferred embodiment, the vertical clearance is proportional to the square of the distance of the corresponding sectional plane (22 through 24) from the vertex 16.

Figure 3:
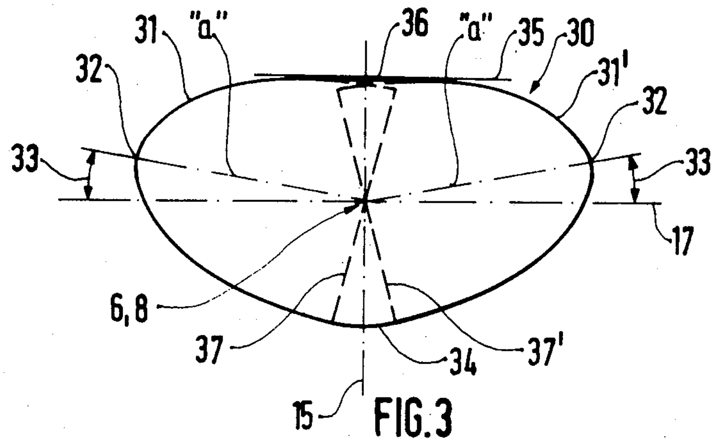
FIG. 3 shows a transverse section of another embodiment of the reflector of this invention, the section being taken in a plane forming right angles with a horizontal plane passing through the optical axis.

In another embodiment shown in FIG. 3, the reflector 30 is also asymmetrical relative to the horizontal plane passing through the focal point of the reflector. The vertical plane 15 passing through the focal point divides the reflector into a left hand half ellipse 31 and into a right hand half ellipse 31'. Both half ellipses have large axes which are tilted relative to the horizontal plane 17 by an angle 33 in such a manner that intersection point 32 of the long axis a with a corresponding half ellipse 31 or 31' is always located above the horizontal plane 17.

In the illustrated example, the inclination angle 33 of the left hand half ellipse 31 equals to the inclination angle of the right hand half ellipse 31' whereby the inclination angle 3 in each vertical sectional plane (22 through 24) is a fraction of the distance of the corresponding vertical sectional plane from the vertex 16 of the reflector 30. In a modification, the inclination angles 33 in respective half ellipses differ from one another. Dashed lines 37 and 37' indicate short axes of respective half ellipses coinciding with right exiting edges of the latter.

Due to the mutual inclination of the left and right half ellipses 31 and 31' the small axes 37 and 37' form wedges 34 and 36 whereby the base of the lower wedge 34 is in the form of a circular or elliptical section, whereas the overlapping parts of the half ellipses above the horizontal plane 17 are replaced by a straight segment lying on a tangential line 35.

Figure 4:
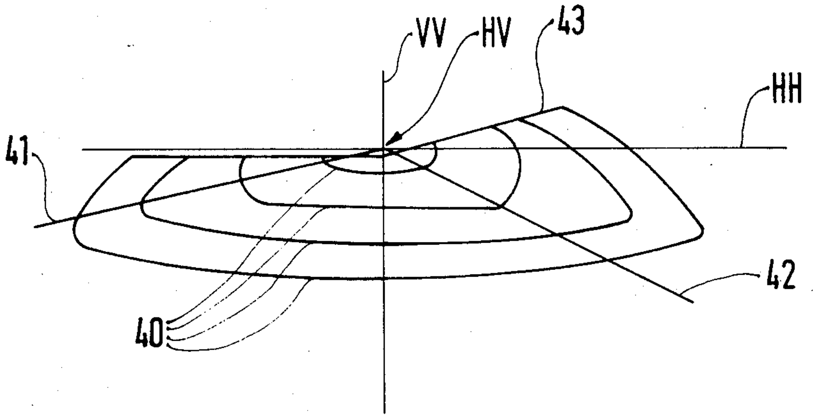
FIG. 4 shows the light distribution of both embodiments of the headlamp of this invention on a roadway.

FIG. 4 illustrates the light distribution of the beam or antidazzle light beam transmitted from the before-described embodiments of the headlamps of this invention. The light distribution is indicated by four isolux lines 40 projected on a measuring screen. The measuring screen indicates a horizontal central plane HH; a vertical central plane VV and an intersection point (vanishing point) HV, as well as the left hand edge 41 and a right hand edge 42 of a roadway. The light distribution indicated by isolux lines 40 near the vanishing point HV, is delimited by a light-dark boundary line 43 sloping upwardly to the right. The boundary line 43 is produced by the action of the before described optically active edge 3 of the screen 2 (FIG. 1). It is evident from FIG. 4 that both edges 41 and 42 of a roadway are sufficiently and intensively illuminated even at a close range from a motor vehicle.

While the invention has been illustrated and described as embodied in specific examples of antidazzle headlights, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A low beam or fog headlamp for motor vehicles comprising a reflector defining a vertex, an optical axis and a focal point, sections of said reflector in planes passing through said optical axis forming curves of higher order, a light source arranged at said focal point, a screen having an edge for delimiting a light-dark boundary plane for a light beam emitted by the light source, a light projecting objective arranged in front of said screen, said curves of higher order being asymmetric relative to a horizontal plane passing through said optical axis, vertical sections of said reflector in parallel planes including right angles with said horizontal plane forming closed curves, the part of respective closed curves lying above said horizontal plane defining an upper half ellipse having a small axis and the part of corresponding closed curves lying below said horizontal plane defining a lower half ellipse having a small axis of different length, and both half ellipses in the respective vertical sections having a common large axis.

2. A headlamp as defined in claim 1, wherein the common large axes of the respective closed curves lie on a plane which inclines upwardly relative to said horizontal plane, and the small axes of the respective closed curves lying on a vertical plane passing through said optical axis.

3. A headlamp as defined in claim 2, wherein the clearance between the common large axes of the respective closed curves and said horizontal plane is a function of the distance of the corresponding vertical sections from the vertex of the reflector.

4. A headlamp as defined in claim 3, wherein said clearance is equal to the second power of the distance of the corresponding vertical section from the vertex of the reflector.

5. A low beam or fog headlamp for motor vehicles, comprising a reflector defining a vertex, an optical axis and a focal point, sections of said reflector in planes passing through said optical axis forming curves of higher order, a light source arranged in said focal point, a screen having an edge for delimiting a light-dark boundary plane for a light beam emitted by the light source, a light projecting objective arranged in front of said screen, said curves of higher order being asymmetric relative to a horizontal plane passing through said optical axis, vertical sections of said reflector in parallel planes including right angles with said horizontal plane forming closed curves, the part of respective closed curves lying to the left of a vertical plane passing through said optical axis defining a left half ellipse and the part of corresponding closed curves lying to the right of the vertical plane defining a right half ellipse, large axes of respective half ellipses lying on inclined planes forming with said horizontal plane such an angle that intersection planes of the large axes with the corresponding half ellipses are above said horizontal plane.

6. A headlamp as defined in claim 5, wherein the angle of inclination of one inclined plane equals the angle of other inclined plane.

7. A headlamp as defined in claim 5, wherein the inclination angle of one inclined plane differs from that of the other inclined plane.

8. A headlamp as defined in claim 5, wherein the inclination angles of the half ellipses in respective vertical sections is a function of the distance of the corresponding vertical section from the vertex of the reflector.

9. A headlamp as defined in claim 5, wherein said half ellipses in respective vertical sections have small axes intersecting each other at said horizontal plane and enclosing an upper and a lower wedge.

10. A headlamp as defined in claim 9, wherein the parts of respective closed curves above said upper wedge is formed by a straight segment coinciding with a tangent line between the left and right half ellipses.

11. A headlamp as defined in claim 10, wherein the part of the closed curve below said lower wedge is in the form of a circular or elliptical segment.

* * * * *